Dec. 26, 1939.　　　　G. C. BEIDLER　　　　2,185,049
SENSITIZING COATING MACHINE
Filed Nov. 30, 1937　　　10 Sheets-Sheet 1
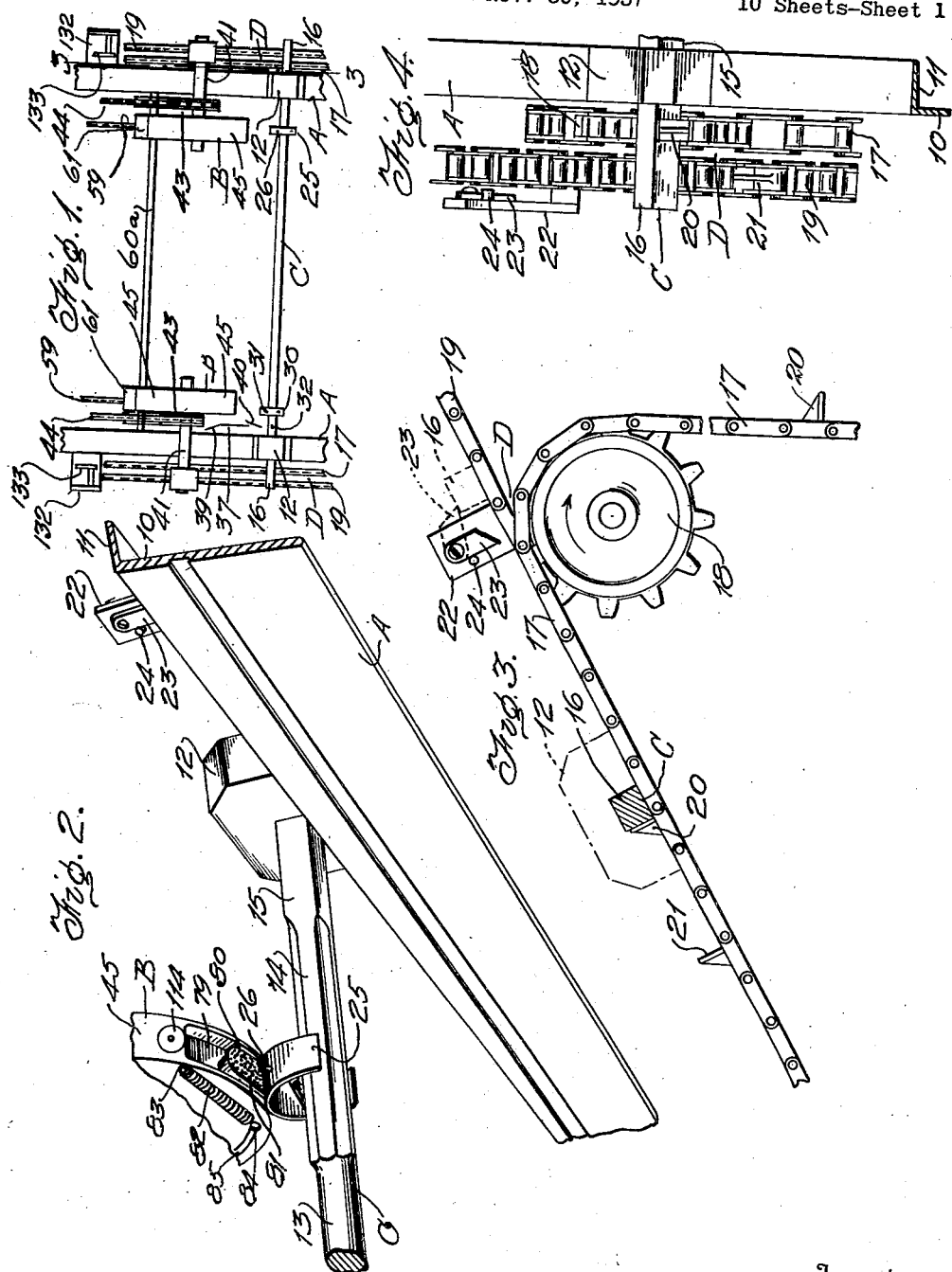
Inventor
George C. Beidler
By Frank S. Appleman
Attorney.

Dec. 26, 1939.  G. C. BEIDLER  2,185,049
SENSITIZING COATING MACHINE
Filed Nov. 30, 1937   10 Sheets-Sheet 2
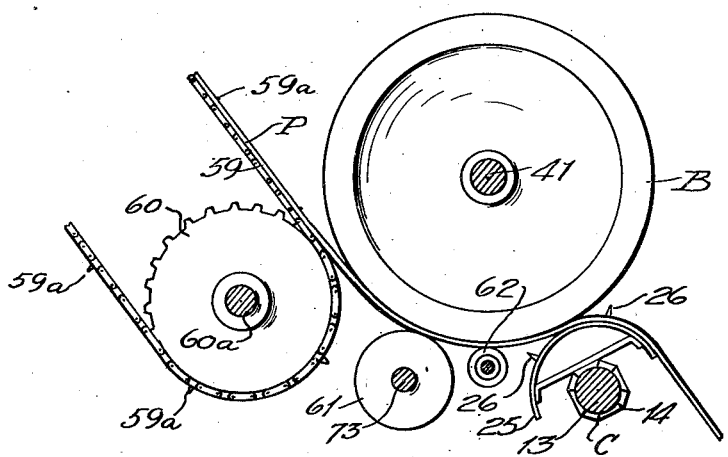
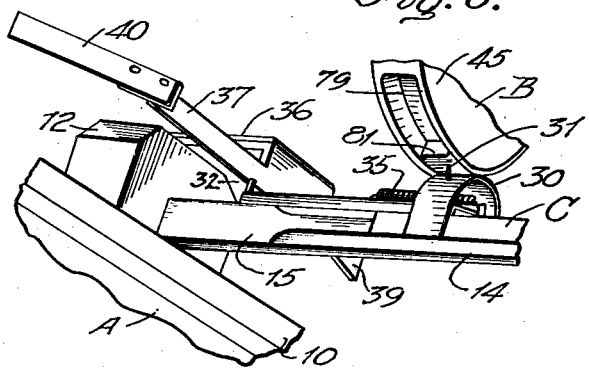
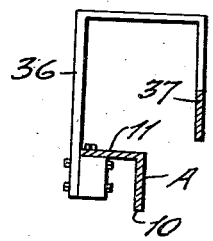
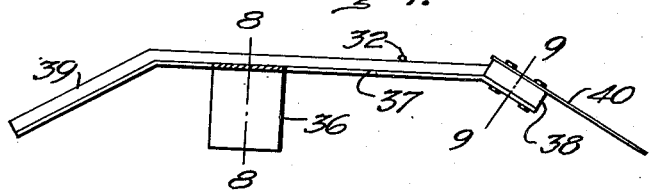
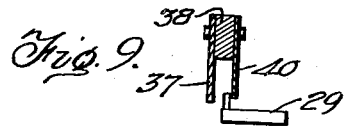
INVENTOR.
George C. Beidler,
BY Frank A. Appleman
ATTORNEYS.

Dec. 26, 1939.  G. C. BEIDLER  2,185,049
SENSITIZING COATING MACHINE
Filed Nov. 30, 1937   10 Sheets-Sheet 3
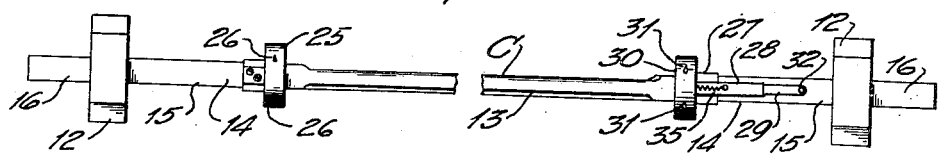
Fig. 10
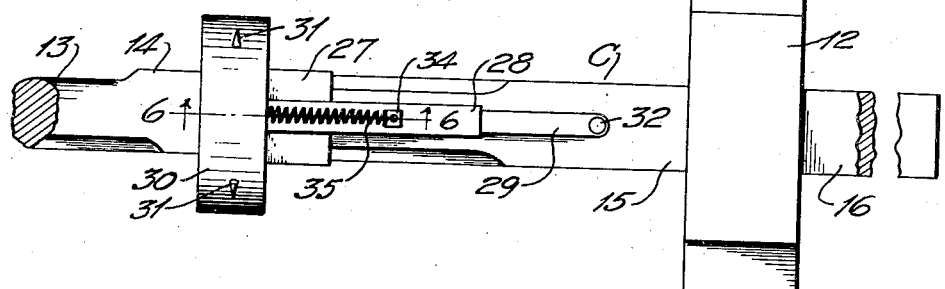
Fig. 11
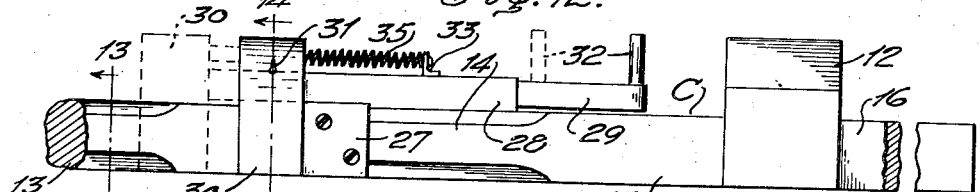
Fig. 12
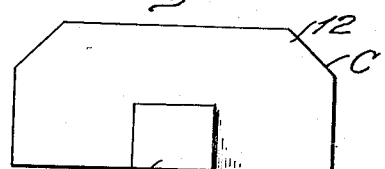 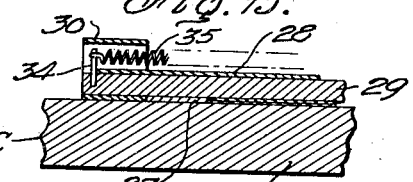
Fig. 13  Fig. 14  Fig. 15
Fig. 16
Inventor
George C. Beidler,
By Frank S. Appleman,
Attorney.

Dec. 26, 1939.　　　G. C. BEIDLER　　　2,185,049
SENSITIZING COATING MACHINE
Filed Nov. 30, 1937　　　10 Sheets-Sheet 4
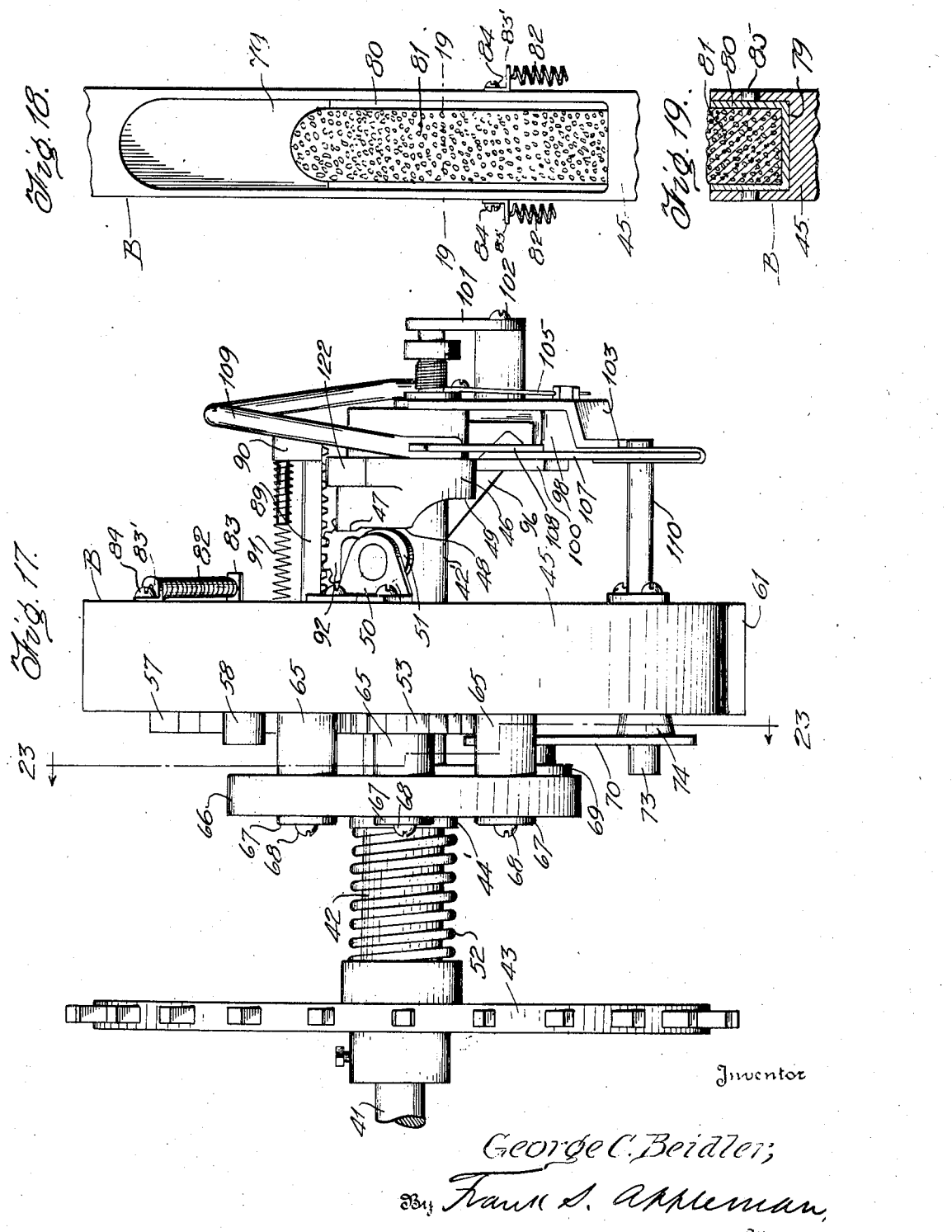
Inventor
George C. Beidler;
By Frank S. Appleman,
Attorney,

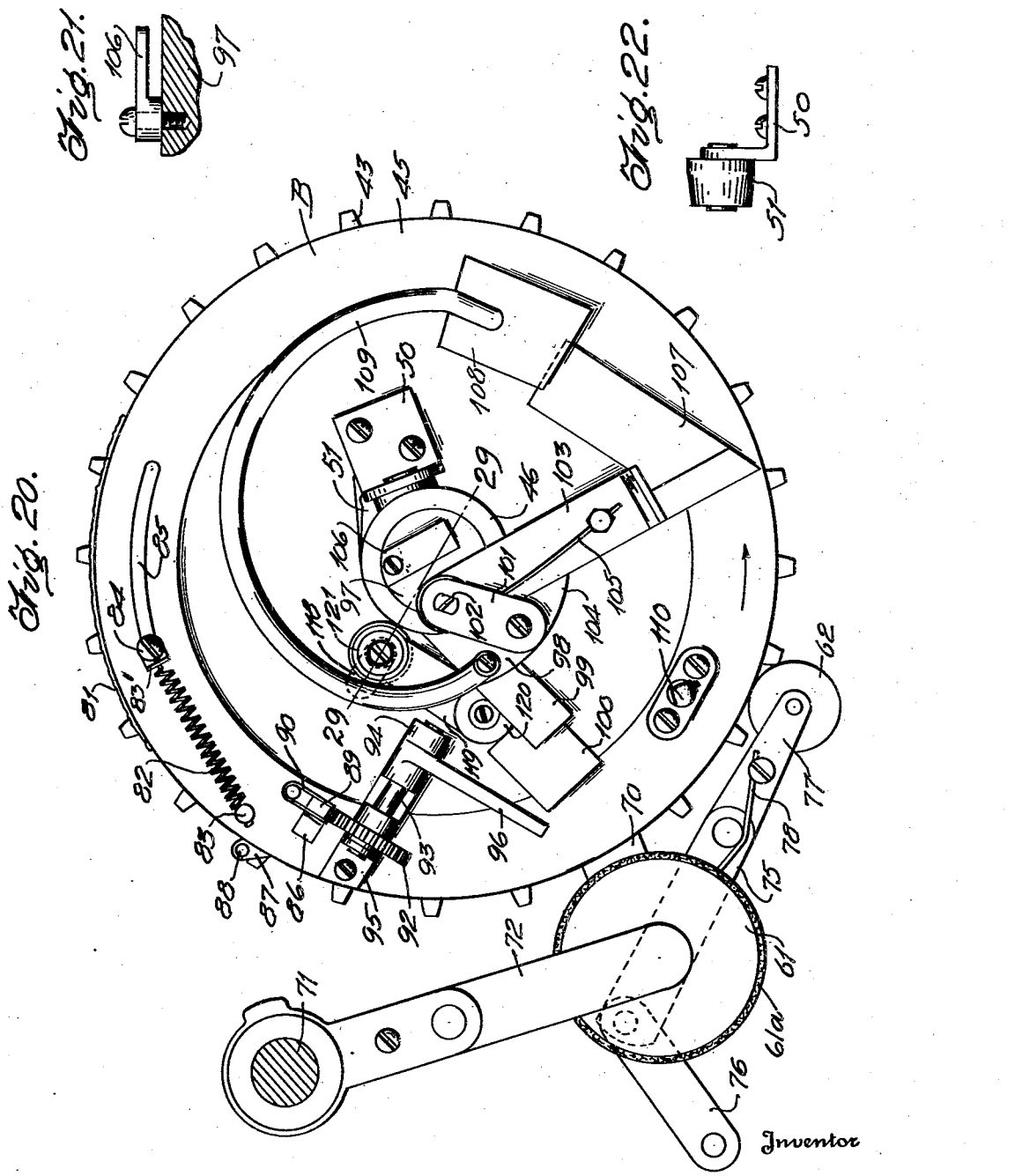

Dec. 26, 1939. G. C. BEIDLER 2,185,049
SENSITIZING COATING MACHINE
Filed Nov. 30, 1937 10 Sheets-Sheet 6
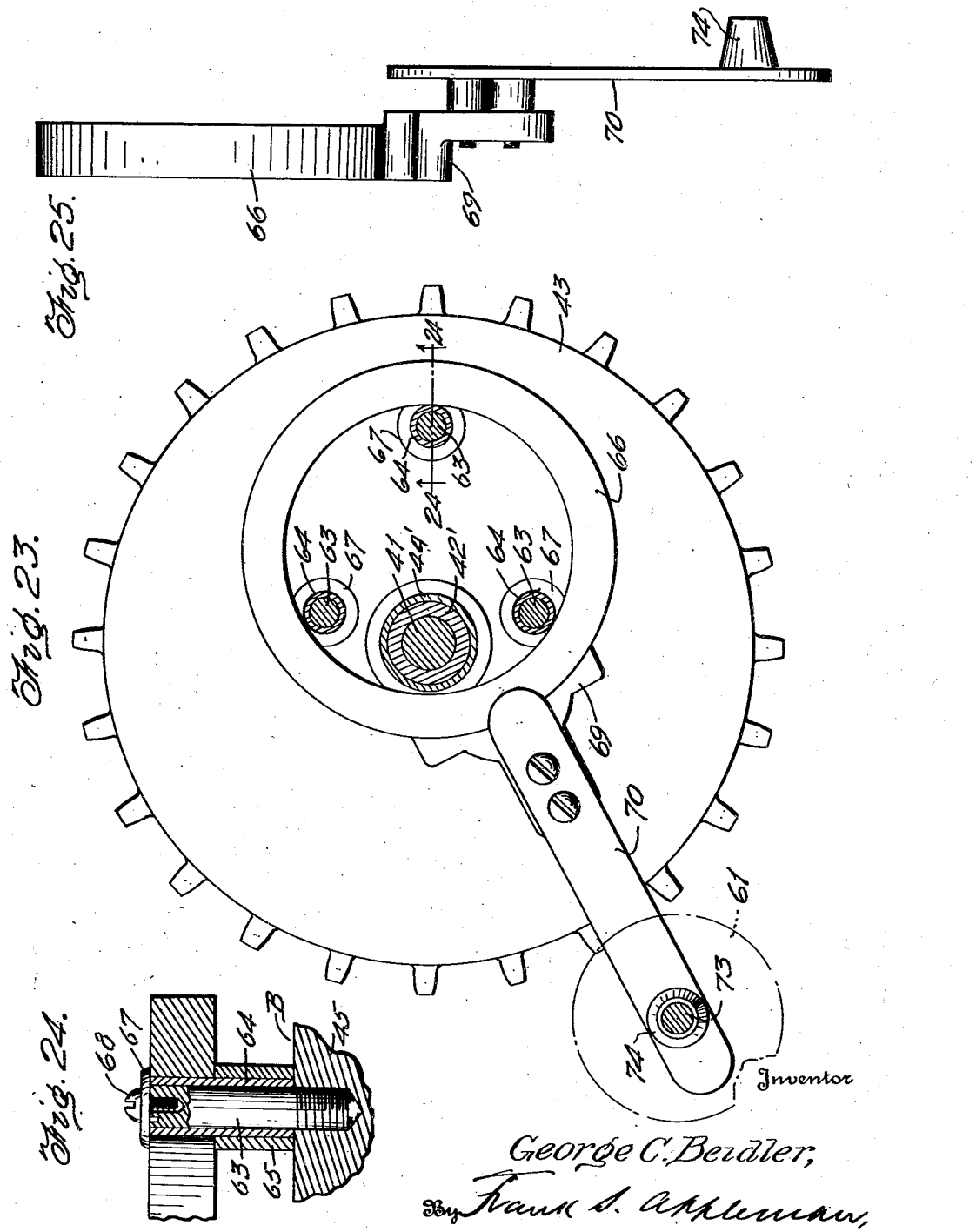
Inventor
George C. Beidler,
By Frank S. Appleman,
Attorney.

Dec. 26, 1939.   G. C. BEIDLER   2,185,049
SENSITIZING COATING MACHINE
Filed Nov. 30, 1937   10 Sheets—Sheet 7
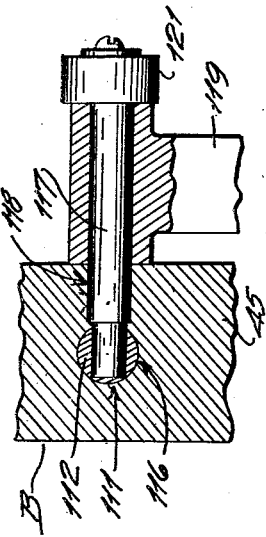
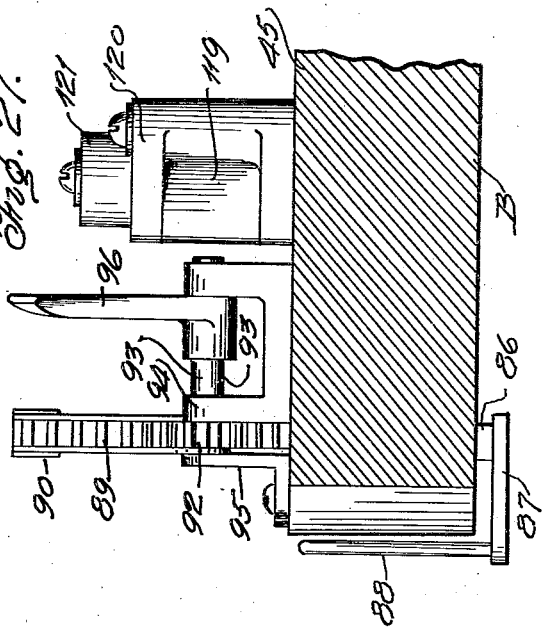
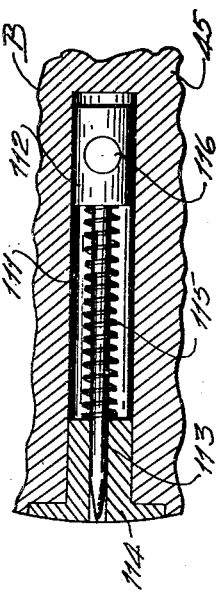
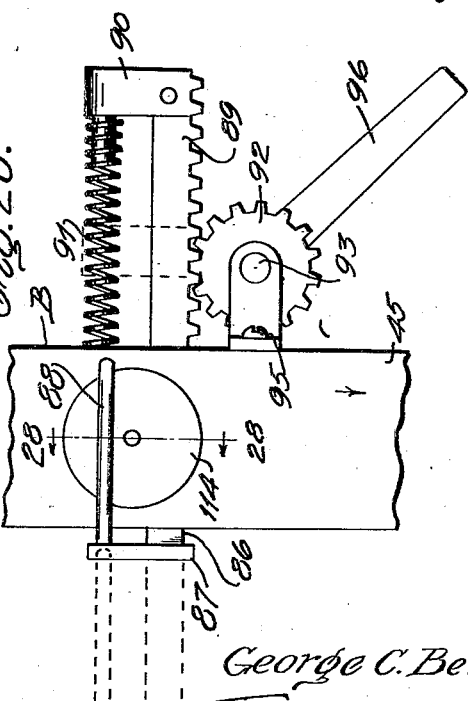
Inventor
George C. Beidler,
By Frank S. Appleman.
Attorney.

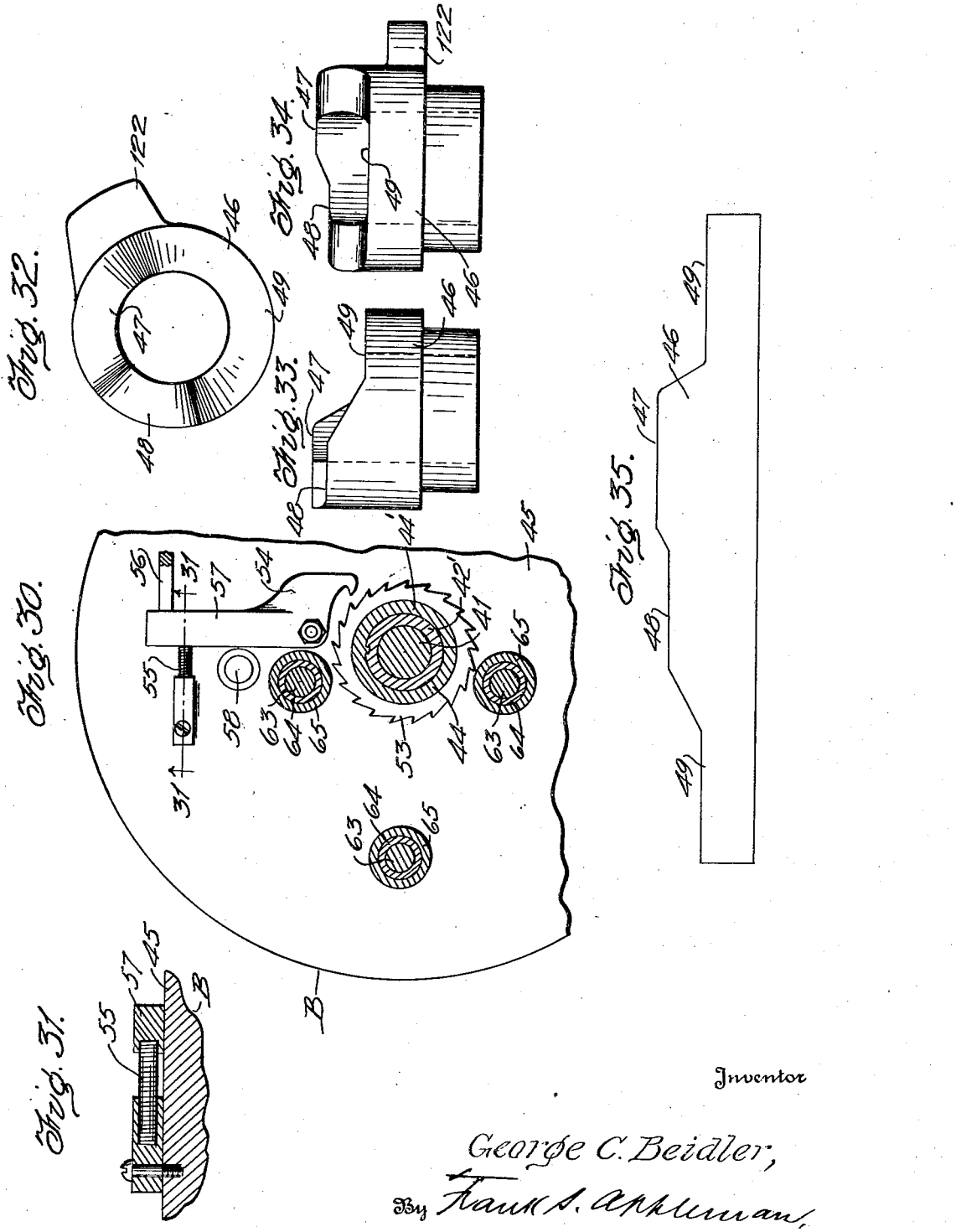

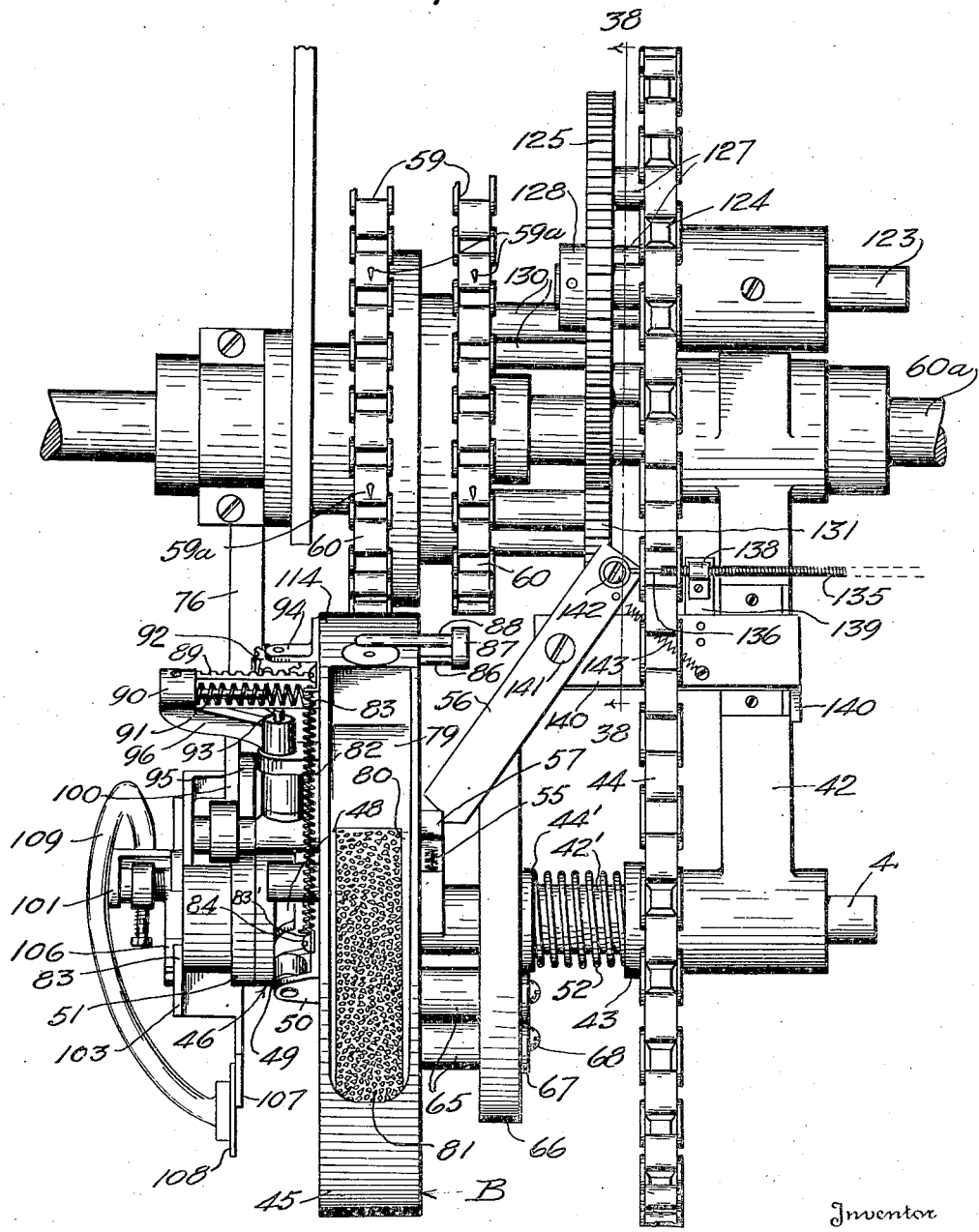

Dec. 26, 1939.   G. C. BEIDLER   2,185,049
SENSITIZING COATING MACHINE
Filed Nov. 30, 1937   10 Sheets-Sheet 10

Inventor
George C. Beidler;
By Frank S. Appleman,
Attorney.

Patented Dec. 26, 1939

2,185,049

UNITED STATES PATENT OFFICE 2,185,049

SENSITIZING COATING MACHINE

George C. Beidler, Rochester, N. Y.

Application November 30, 1937, Serial No. 177,350

29 Claims. (Cl. 271—2.2)

This invention relates to machines for coating film with a sensitized emulsion, and the invention relates more particularly to a machine intended for use in coating two sides of a film simultaneously, and to means for transferring a web of film to conveying sticks or carriers which are moved through a tunnel for the purpose of subjecting the sensitizing coating to a drying agency.

It is an object of this invention to provide a novel carrier for the film, which carrier is associated with a stick and provided with operative means to compensate for the expansion of the film when it is first subjected to the action of the emulsion and the contraction of said film which gradually takes place as the film dries.

If the film is allowed to sag as it expands when it is moistened by the application of the emulsion, its transverse central portion is apt to contact with the stick and that, of course, will ruin the coating by rendering the said coating ununiform. Hence, it has been found desirable, if not necessary, to maintain the film in a stretched state to guard against the aforesaid sagging action. By maintaining the film in a stretched state, uniformity in the thickness of the coating and drying of the film will take place, a condition which will not obtain if the film sags between its supporting elements.

The purpose of the inventor, therefore, is to maintain the film in a stretched state from the time it is coated until the emulsion sets or becomes hard and, to that end, the sticks are provided with film engaging segments of certain radius which will so arch or bridge the film as to further prevent sagging or breaking between its supported areas. Of course film of this character has to be held at its edges or near its edges by the supporting instrumentalities so that the whole area of the film, except perhaps at its extreme margins, can be coated.

While the term "film" has been used in a generic sense, the invention has its greatest utility in connection with the coating of paper film, since such film has an increased expansive and contractive characteristic compared with other known carriers of emulsion.

It is a further object of the invention to provide novel means for applying the film to the carriers or the segments which are provided with pins for impaling or impinging the film, and novel means, as stated, are provided for pressing the paper on the pins and then freeing the carriers with the film attached thereto; the said impaling instrumentality being also associated with means for operating the film tensioning device associated, in this embodiment of the invention, with the stick and the aforesaid segmental supports.

It is a further object of the invention to provide novel means for intermittently conveying the sticks and for holding them stationary for a time at a predetermined position, during which time the coating of the film continues and a loop or festoon is formed which depends from the carrier, as is customary in film coating machines where the film in loops is conveyed through the usual tunnels for chilling and drying the emulsion. The coating machine itself and the instrumentalities for conveying the coated film to the carriers is not a part of the present invention and need not be shown to a greater extent than where the film is illustrated as being engaged in its travel from the coating machine to the location where it is impaled on the carriers.

With the foregoing and other objects in view, the invention consists in the details of construction and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a semi-diagrammatic plan view showing the general arrangement of the main parts of the invention;

Figure 2 illustrates a detail perspective of a portion of the right side of Fig. 1;

Figure 3 illustrates a side elevation of a portion of the right side of Fig. 1, the view being on an enlarged scale and on the line 3—3 of Fig. 1;

Figure 4 illustrates an elevation of the parts shown in Fig. 3 from the left side of that figure.

Figure 5 illustrates a view partly in elevation and partly in section showing the general arrangement of the manner of feeding the web of paper, the view having details omitted to avoid confusion in the showing;

Figure 6 illustrates a detail perspective of the parts on the left side of Fig. 1 corresponding to those on the right side as shown in Fig. 2;

Figure 7 illustrates a plan view of a certain fixed cam arrangement used in connection with means for laterally stretching the paper web to prevent wrinkling thereof;

Figure 8 illustrates a section on the line 8—8 of Fig. 7;

Figure 9 illustrates a section on the line 9—9 of Fig. 7;

Figure 10 illustrates a plan view of one of the sticks used in connection with this device;

Figure 11 illustrates an enlarged plan view of one end of said stick;

Figure 12 illustrates a side elevation of the parts shown in Fig. 11;

Figure 13 illustrates a section on the line 13—13 of Fig. 12;

Figure 14 illustrates a section on the line 14—14 of Fig. 12;

Figure 15 illustrates a section on the line 6—6 of Fig. 11;

Figure 16 illustrates an end elevation of Fig. 11, taken from the right of Fig. 11;

Figure 17 illustrates a large scale elevation of one of the main feed rolls and the parts carried thereby;

Figure 18 illustrates an edge view of a portion of a main feed roll showing a part of the edge not disclosed in Fig. 17;

Figure 19 illustrates a section on the line 19—19 of Fig. 18;

Figure 20 illustrates a face view of the main feed roll with the parts carried thereby and also showing auxiliary feed rolls associated with the main roll;

Figure 21 illustrates a side elevation of a cover plate shown in Figure 20, and disclosing the manner in which the plate is secured;

Figure 22 illustrates a side elevation of a certain camming roll and its bracket as shown in Fig. 20;

Figure 23 illustrates a section on the line 23—23 of Fig. 17;

Figure 24 illustrates a section on the line 24—24 of Fig. 23;

Figure 25 illustrates an edge view of a certain eccentric ring and blade disclosed in Fig. 23;

Figure 26 illustrates an edge view of a portion of one of the main feed rolls showing a certain paper web clipping or holding means and part of its operating mechanism;

Figure 27 illustrates a section through the feed roll of Fig. 26 and showing an elevation of the clipping means and operating mechanism at right angles to the manner in which the parts are shown in Fig. 26;

Figure 28 illustrates a section on the line 28—28 of Fig. 26;

Figure 29 illustrates a detail section on the line 29—29 of Fig. 20;

Figure 30 illustrates a detail section on the line 23—23 of Fig. 17, but in the opposite direction to the arrows on said line;

Figure 31 illustrates an enlarged section on the line 31—31 of Fig. 30;

Figure 32 illustrates a face view of a certain cam used in connection with a main feed roll;

Figure 33 illustrates a side view of the cam shown in Fig. 32;

Figure 34 illustrates a second side view of said cam at right angles to Fig. 33;

Figure 35 illustrates a developed diagram of said cam;

Figure 36 illustrates a plan view of one of the main feed rolls and the parts adjacent thereto;

Figure 37:
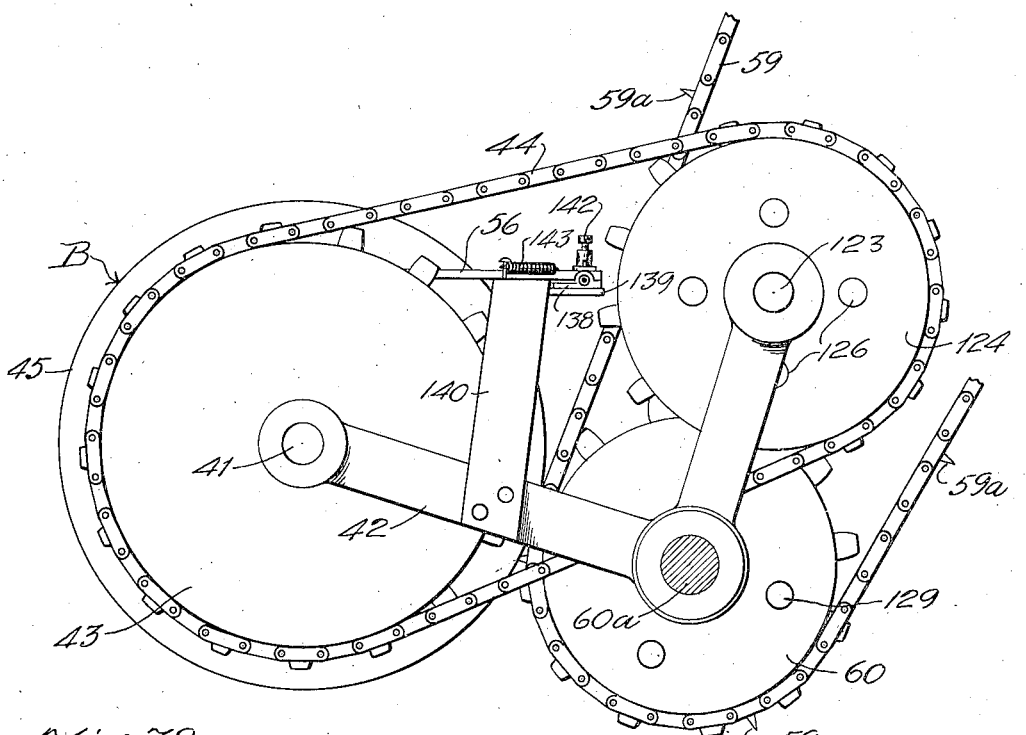
Figure 37 illustrates a side elevation of certain of the parts shown in Figure 36, the view disclosing the driving means and a rocking bracket used in the invention.

In general, as shown in Fig. 1, the apparatus includes a pair of spaced rails A across which a shaft extends carrying a pair of main feed rolls B provided with mechanisms for various purposes which are not shown in Fig. 1 but are fully shown in other figures. Also, there is provided a number of carrier rods, generally known in the art as sticks, one of which is shown at C, and chains D for moving the sticks along the rails A. It is to be clearly understood that Fig. 1 is merely a diagram for the purpose of illustrating the manner in which the complete device, described hereinafter in detail, is assembled. Accordingly, no attempt has been made to include details in Fig. 1, as such details would be to such a small scale that they would confuse rather than add to an understanding of the invention.

Each of the rails A comprises a vertical portion 10 and a horizontal flange 11, the said rails being arranged parallel to each other and inclined upwardly from the feed ends. The horizontal flanges of the two rails lie in the same plane and are directed away from each other, thus projecting outwardly from the vertical portions 10.

Each of the sticks C is provided at each end with a supporting block or slide 12 which is supported on one of the horizontal flanges 11 and travels along a rail A. These slides 12 are connected by a transverse rod having a central portion 13 rounded on one side and having angularly disposed faces on the other side. This central portion merges at its ends into octagonally prismatic portions 14 which again merge into portions 15, which portions 15 are continued through the slides 12 and terminate in ends 16 projecting beyond the rails. The conveyor chains D pass just below the projecting ends 16 and each of these chains consists of a pair of relatively fast moving chains 17 each of which extends parallel to the rails A for some distance and then runs down over a sprocket 18, as shown in Figs. 3 and 4. Alongside of the inclined portion of each chain 17 is a relatively slow moving chain 19 which travels up along a rail A beyond the sprocket 18. On the chain 17 are spaced lugs, one of which is shown at 20, and similarly the chain 19 carries spaced lugs, one of which is shown at 21. Secured to each rail A is a bracket 22 which is positioned just above the sprocket 18. This bracket carries a depending pawl 23 lying in the path of the end 16 of rod 13 of the sticks moved by the chains, and the pawl is held in normal position by a stop 24. This pawl has an end adapted to engage the upper rear angle of the end 16, as shown in dotted lines in Fig. 3. With this arrangement, each stick C is moved up along the rails A slowly by engagement of the lugs 21 with the ends 16 of the stick until it comes into position with the ends 16 above the fast moving chain, whereupon it is engaged by lugs 20 and moved away from the lugs 21 and up past the pawls 23 which engage the ends 16 and prevent the stick from slipping back down the inclined rails A. The stick is held in this position, since the lugs 20 pass down over the sprockets 18 and disengage from the ends 16, until the lugs 21 again overtake and engage the ends 16, whereupon the stick is again moved slowly forward on the rails A.

During the time that the stick is stationary and is held by the pawls 23, it supports the sensitized film which has been applied to it when the stick has moved into cooperative relation with other parts of the apparatus, as will presently appear. During the dwell or period when the stick is at rest as aforesaid, additional coated film is being fed in well known manner to a degree or length which will form a festoon or loop which hangs down from the stick. When the loop or festoon has reached a predetermined length, the lugs 21 on the moving chain 19 reaches the position of rest of the stick held by the pawl and the said stick is then conveyed upwardly through a suitable chamber, such as a chilling chamber, and to a drying tunnel such as commonly employed during the finishing process to which emulsified films are subjected. The stick may be moved under the influence of the lugs 21 prior to the time that the loop or festoon has developed its full length and additional lengths of the film may be delivered during the movement of the said stick toward the chamber or tunnel.

Fixed to one octagonal portion 14 of the stick, at one of its ends, is an arcuate paper support 25 having outwardly projecting radial prongs 26. At the other octagonal portion 14, there is provided a saddle 27 which is fixed to the rod and carries a rectangular tube 28 wherein is slidably fitted a plunger 29 which has an end projecting toward the center of the stick and on this end is fixed a paper support 30 corresponding to the paper support 25 at the other end and, like it, having prongs 31. The bar or plunger 29 also projects from the other end of the tube 28 and carries an upstanding pin 32. On the tube 28 is a bracket 33 and on the inner end of the plunger 29 is a pin 34, this bracket and the pin forming anchors for a tension spring 35 which urges the paper support 30 toward the adjacent end 16. The rail A near this end of the stick is provided with a bracket 36 close to the roll B on this side, and this bracket 36 carries a camming bar 37 (see Figs. 7 and 8) arranged with an end portion 39 engaging the pin 32 as the stick approaches the roll B to move the paper support inwardly, as shown in dotted lines in Fig. 12, and then to carry it in this position under and past the roll B to be engaged by a spring cam 40 carried by a spacer 38 and arranged to aid the spring 35 in retracting the paper support 30 toward the adjacent end 16. This action takes place as the stick C moves under the influence of the chains 17. As will be presently explained, a paper web is engaged adjacent its side edges by the prongs 26 and 31 as the stick passes beneath the rolls B and the movement of the paper support 30 causes an engagement of the prongs and then, stretching of the paper web by the spring 35. Because it is undesirable to apply too much stretching stress, the spring cam 40 is made to yield upon the proper stress being reached.

The main feed rolls are each supported on a shaft 41 carried by one arm of a bell crank bracket 42 and these rolls are respectively right and left hand. Revolubly mounted on each shaft 41 is a sleeve 42' whereon is fixed a sprocket 43 driven by a chain 44. Splined on the sleeve 42' is a sleeve 44' whereon is revolubly mounted the main feed wheel 45, the sleeve 42' extending entirely through the sleeve 44' and thus projecting through the wheel 45. Fixed on the projecting end of the shaft 41 is a cam 46 having the face adjacent the wheel 45 provided with a high segment 47, an intermediate segment 48 and a low segment 49. Fixed on the wheel 45 is a bracket 50 carrying a cam roller 51 which bears constantly on the cam face, being held thereagainst by a spring 52 surrounding the sleeve 42' between the sprocket 43 and the adjacent end of the sleeve 44'. While the wheel 45 is revolubly mounted on the sleeve 44', a ratchet 53 is fixed on the sleeve and revolves therewith as the sprocket is actuated, the latter rotating constantly during the operation of the machine. Pivoted on the wheel 45 is a pawl 54 urged by a spring 55 into engagement with the ratchet 53. A stop 56 engages the pawl tail 57 upon each complete revolution of the wheel 45 and causes it to disengage from the ratchet 53, the extent of disengagement being limited by a stop 58 fixed on the wheel 45.

As shown diagrammatically in Fig. 5, the paper web P is fed at each edge down chains 59 each passing around a sprocket 60. These sprockets 60 are mounted on a shaft 60a extending across the machine and suitably supported at each side thereof. The brackets 42 are rockingly mounted at their angles on the shaft 60a. The chains 59 are provided at intervals with paper engaging pins 59a. From the chains 59 the web P passes over an auxiliary feed roller 61 and a second and smaller feed roller 62. This auxiliary feed roller has a sponge rubber periphery 61a. Since the timing of the parts is such that the movement of the stick C under the influence of the chains 19 is slower than the peripheral speed of the wheel 45 upon rotation, in order that loops or bights may be formed between the successive sticks, the paper must continue to feed past the wheels 45 while they are at rest. Also, the wheels 45 revolve intermittently and for these reasons it is necessary that the paper during stoppage of the wheels 45, shall roll freely over the rollers 61 and 62. In order to free the rollers 61 and 62 so that the paper will not be gripped between them and the wheel 45, there is mounted on the rear face of the wheel 45 a set of pins 63 which are disposed at the angles of an equilateral triangle and are so positioned that the center of a circle circumscribed about these pins and tangent thereto will be disposed eccentrically to the center of the wheel. As best shown in Fig. 24, there is mounted on each of these pins a revoluble sleeve 64 and a spacing sleeve 65 is mounted on each pin to rest against the wheel 45, the spacing sleeves terminating in spaced relation to the ends of the sleeves 64. On the projecting ends of the sleeves 64 is mounted a ring 66 which is thus supported as an eccentric strap, the sleeve and pin arrangement forming an eccentric embraced by this strap. The ring or strap 66 is held in position on the sleeves 64 by caps 67 secured to the ends of the pins 63 by screws 68. Attached to the ring 66 is a bracket 69 which carries an eccentric blade or rod 70. Swingingly mounted on a frame rod 71 is an arm 72 carrying a stub shaft 73 whereon the roller 61 is revolubly mounted. On the blade 70 adjacent its free end is a sleeve 74 wherein the stub shaft 73 is slidably mounted so that the lateral movement of the wheel 45 relative to the roller 61 may be effected. On the stub shaft is mounted a lever 75, one arm of which is connected to swing on the shaft 60a by a swinging link 76. The other arm of the lever 75 has pivoted thereto an arm 77 which is held in normal alinement with the lever 75 by a spring 78. This arm carries at its free end the roller 62.

With this arrangement the eccentric acts, as the wheel 45 rotates, to alternately move the rollers toward and from the wheel 45.

In order to grip the paper firmly between the wheel 45 and the paper supports 30 as they pass beneath the wheel and also to allow for the movement of the sticks slower than the wheel, there is provided a pocket 79 formed in the periphery of the wheel and extending arcuately therearound. In this pocket is fitted an arcuate slide 80 of channel shape in cross section and the channel is filled with an arcuate mass 81 of sponge rubber which, as shown in Figs. 18–19, normally projects beyond the periphery of the wheel 45. The slide is normally held at what may be termed the forward or advancing end of the pocket by springs 82 which have their forward ends fixed to posts 83 and their rear ends fixed to brackets 83′ by screws 84 passing to the slide through arcuate slots 85 formed in the side faces of the wheel 45, as shown in Fig. 20. The movement of the sticks and the rotation of the wheel 45 are so timed that a paper support 30 engages the forward end of the mass 81 at each revolution of the wheel 45. As the wheel 45 has a greater peripheral speed, due to the member 25 on the stick elevating the wheel shown in Fig. 6, than the lineal speed of the sticks, the continuance of the rotation of the wheel causes the latter to move faster than the mass can move, so that the wheel advances to cause the slide to be engaged by the rear end of the pocket 79. Then, as the stick passes clear of the arcuate mass, the springs which have been tensioned by the movement just described, retract the slide to its normal position. It will be noted that the screws 84 serve to hold the slide in its pocket.

At a certain part of the revolution of the wheel, it is desirable to hold the edge of the paper web close to the periphery of the wheel 45 while, during the remainder of the revolution, it is desirable that the paper web be free from the wheel. The paper web is held from the time it leaves the feed chains 59 until it is engaged on the stick after which it is freed. To accomplish this, there is provided a plunger 86 which passes through the wheel from side to side and projects at each side. On the outer side of the wheel this plunger carries a head 87 which supports a finger 88 extending across the peripheral face of the wheel closely adjacent thereto. The function of this finger is to engage the outer surface of a portion of the paper web P in contact with the wheel when said finger is in position across the wheel. The other end of the plunger carries a rack 89 on the end of which is fixed a bracket 90 which supports one end of a coiled compression spring 91 having its end supported by the wheel 45. This spring urges the finger to operative position (Fig. 26). The rack 89 meshes with a gear 92 fixed on a shaft 93 journaled in a bracket 94 fixed to the front face of the wheel 45. A bracket 95 may also aid in supporting the shaft 93. On the shaft 93 is fixed an operating lever 96 which normally extends angularly forward with reference to the direction of rotation of the wheel from the shaft 93. The shaft 41 is provided with a head 97 (Fig. 20) to which there is fixed a plate 98 carrying an arm 99. This arm supports a blade 100 which lies in the path of the lever 96 as the wheel 45 rotates. When the lever 96 engages the blade 100, the rotation of the wheel causes the lever to swing in an anti-clockwise direction as viewed in Fig. 20 and this, through the gear and rack, retracts the finger 88, as shown in dotted lines in Fig. 26. As soon as the lever 96 passes the blade 100, the spring 91 returns the finger to normal position. This retraction of the finger occurs just at that point in the revolution of the wheel at which the finger approaches the paper web P. The return to normal occurs as soon as the finger passes the plane of the paper web so that the finger then engages the paper web and holds it to the periphery of the wheel. On the plate 98 is fixed a bracket 101 (Fig. 20) which supports a fixed shaft 102 whereon is pivoted an end of arm 103, the shaft being eccentric to the axis of the wheel 45. The plate 98 carries a stop 104 against which the arm is normally held by a spring 105. A stop 106 limits movement of the arm 103 against the action of the spring 105. This arm carries a blade 107 which is in sliding and overlapping contact with a blade 108 mounted on a fixed bracket 109. The blades 107 and 108 lie in the path of the lever 96 which is operated to retract the finger 88 by the action of the blade 100. On the front face of the wheel 45 is fixed a post 110 which, by the revolution of the wheel, engages the back of the blade 107 and moves it against the action of the spring 105. Due to the eccentricity of the pivot shaft 102, after the post 110 has moved the blade 107 a certain distance, the blade will ride over the post and, by action of the spring 105, will return to normal position. The post 110 is so positioned in relation to the shaft 93 that upon the blade 107 being released from the post, this blade will engage and quickly turn the lever 96 to finger-retracting position, thus releasing the paper web. The lever 96 will continue in finger-retracting position until it rides off the blade 108, whereupon it will be returned to normal position by the action of the spring 91.

Provision is made to keep the paper web from slipping during the first part of its engagement by the finger 88 so that it cannot accidentally slide from between the finger and wheel 45. To this end, the wheel 45 is provided, adjacent the finger 88, with a radial bore 111 wherein is mounted a plunger 112 carrying a needle 113. The outer end of this bore is closed by a needle guide 114 and the needle is held normally retracted by a spring 115 (Fig. 28). In the plunger 112 is provided an opening 116 wherein is fitted the end of a pin 117 projecting through a slot 118 formed in the front face of the wheel 45. This pin is supported by the free end of an arm 119 pivotally mounted on a bracket 120 on the front face of the wheel 45 and the pin projects from the arm and carries a cam roller 121 (Figs. 27 and 29). On the cam 46 is a camming lug 122 which projects peripherally from the cam and is positioned to be engaged by the cam roller 121 just before the lever 96 passes off of the blade 100. By this engagement the needle is projected and passes through the paper web to hold the latter from slipping until the roller 61 engages and grips the paper web. The timing of this part of the device is such that the needle 113 remains engaged with the paper until the stick passes beneath the wheel 45 and engages the paper. The roller 121 then passes from the cam lug 122 and the spring 115 again retracts the needle.

Figure 38:
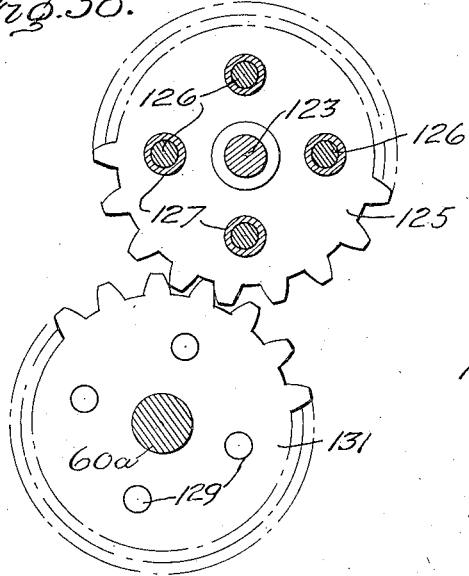
Figure 38 illustrates a fragmentary section on the line 38—38 of Figure 36 and showing the gearing connecting certain shafts.
Figure 39:
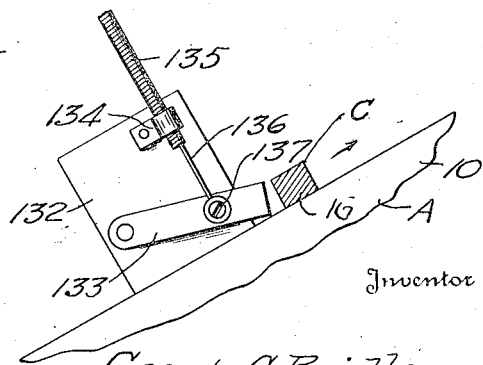
Figure 39 illustrates an enlarged showing in side elevation of a certain means used herein to effect tripping of a latch to start the main feed roller rotating.

By reference to Figs. 36, 37 and 38, it will be seen that, while one arm of the bell crank 42 carries the shaft 41, the other arm has a shaft 123 fixed therein. As shown best in Fig. 37, the shaft 123 has a sprocket 124 mounted thereon and the chain 44 extends around the sprocket 124 as well as the sprocket 43. It will be noted that in Fig. 37 many parts are omitted in order to show the arrangement of the remaining parts without confusion. On the shaft 123 is also mounted a gear 125 which is connected to the sprocket 124 by screws 126 passing through spacing sleeves 127. A collar 128 serves to hold the sprocket 124 and gear 125 on the shaft 123. It will be seen in Fig. 36 that there are two sprockets 60. One of these sprockets 60 is connected by screws 129 and spacers 130 with a gear 131 mounted on the shaft 60a and meshing with the gear 125. By this means the shaft 41 is constantly driven even when the wheel 45 is raised by the stick passing beneath it.

Mounted on each side rail is a bracket 132 to which is pivoted one end of a trip arm 133. This arm lies in the path of the sticks C so that as each stick moves along the rail A it passes beneath and lifts the arms 133. A clamp 134 secures the sheath 135 of a Bowden wire 136 to the bracket 132. The wire 136 is secured to the arm 133 as by a screw 137. The remaining end of the sheath is secured by a clamp 138 to an arm 139 carried by a bracket 140 fixed to the bell crank 42. The latch arm 56 is pivoted to the bracket 140 as at 141 so as to form a two-armed lever, one arm of which normally engages the pawl tail 57. The Bowden wire 136 is secured to the remaining arm of this lever by a screw 142. A spring 143 connects this last arm and the bracket 140 so that the latch arm 56 is constantly urged into position to engage the tail 57.

Normally the wheels 45 are at rest, but as a stick C passes the trip arms 133, these arms lift and push on the Bowden wire so that the latches 56 are freed from the pawl tails 57 and the pawls 54 engage the constantly rotating ratchets 53 and the wheels 45 start to rotate. As soon as the stick C passes from beneath the trip arms 133, these arms are free to fall and the springs 143 act to restore the latch 56 to pawl tail engaging position so that upon the completion of one revolution of the wheels 45, the pawls 54 are disengaged from the ratchets 53 and the wheels 45 cease to move. Thus the sticks are moved in succession beneath the trip arms 133 and then beneath the wheels 45. As the sticks are thus moved, each wheels 45 is intermittently engaged, by the action of the trip lever, to its continuously revolving ratchet 53, each engagement causing one complete revolution of the wheel. As the wheel rotates, the finger 88 is first retracted and then released to engage the paper web as it is fed to the wheel. As soon as engagement is effected, the needle 113 is actuated to pierce and hold the paper web at which time it is engaged by the roller 61 through the action of the eccentric strap 66. The finger 88 continues to hold the paper web until the edge of the paper web is gripped between the stick and the arcuate mass 81, after which the blade 107 acts to retract the finger 88 and release the paper web which is now draped over the stick. During this time, the cam arrangement at one side of the machine has moved one paper support 30 toward the other so that the paper web is engaged by the prongs 31 in such manner that, upon the pin 32 moving off its cam, the paper web will be in laterally stretched condition. Further movement of the wheel 45 restores all parts thereon to normal position and the wheel temporarily ceases to revolve so that a proper length of paper web may be fed from the feed chains to form a bight before the next stick arrives beneath the wheel 45.

I claim:

1. In a sensitizing coating machine, means for carrying film comprising members having laterally spaced curved film supports engageable only at the edge portions of a coated film, the radii of which are of such magnitude as to cause arching of the supported film proportional to its buckling resistance when carrying an emulsion coating and operative to prevent such buckling.

2. In a sensitizing coating machine, means for carrying film comprising members having laterally spaced curved film supports engageable only at the edge portions of a coated film, the radii of which are of such magnitude as to cause arching of the supported film proportional to its buckling resistance when carrying an emulsion coating and operative to prevent such buckling, and means for moving the supports relatively longitudinally of the member for carrying film, to compensate for expansion and contraction of the film.

3. In a sensitizing coating machine, means for carrying film comprising members having laterally spaced curved film supports engageable only at the edge portions of a coated film, the radii of which are of such magnitude as to cause arching of the supported film proportional to its buckling resistance when carrying an emulsion coating and operative to prevent such buckling, and film impaling members projecting from the film supports.

4. In a sensitizing coating machine, means for carrying film comprising members having laterally spaced curved film supports engageable only at the edge portions of a coated film, the radii of which are of such magnitude as to cause arching of the supported film proportional to its buckling resistance when carrying an emulsion coating and operative to prevent such buckling, film impaling members projecting from the film supports, and means for forcing film on the impaling members.

5. In a sensitizing coating machine, means for carrying film comprising members having laterally spaced curved film supports engageable only at the edge portions of a coated film, the radii of which are of such magnitude as to cause arching of the supported film proportional to its buckling resistance when carrying an emulsion coating and operative to prevent such buckling, film impaling members projecting from the film supports, means for forcing film on the impaling members, means for conveying the members successively past the means for forcing film on the impaling members, and means for successively holding the members supporting the film periodically stationary.

6. In a sensitizing coating machine, means for carrying film comprising members having curved film supports, means for holding film on said supports, means whereby relative movement of the supports longitudinally of the member for carrying film is produced, and means for applying the film to the means for holding film on the supports.

7. In a sensitizing coating machine, means for carrying film including film supports, means for conveying said means, feed wheels operative in conjunction with the film supports for applying film thereto, means for moving the feed wheels into and out of operative relation to the film supports, and means for intermittently rotating the feed wheels.

8. In a sensitizing coating machine, a feed wheel the periphery of which is engaged by a film during the feeding of the film, a film carrier with which the wheel coacts, said film carrier having spurs on which the film is pressed during the operation of the wheel and the movement of the film support, the said wheel having an arcuate pocket, an arcuate slide in the said pocket, yieldable material in the slide for engaging film and forcing it on the spurs, and means for holding the slide in normal position and yieldable to permit the slide to move in the pocket.

9. In a web drying machine, a pair of parallel tracks, a series of sticks extending between said tracks and movable therealong, means to feed a web over the tops of said sticks, means to advance the sticks along the tracks and arranged and constructed to produce the differential movement of adjacent sticks whereby to produce festooning of said web, and means to produce transverse stretching of the portions of the web extending over the respective sticks.

10. In a web drying machine, a pair of parallel tracks, a series of sticks extending between said tracks and movable therealong, means to feed a web over the tops of said sticks, means to advance the sticks along the tracks and arranged and constructed to produce the differential movement of adjacent sticks whereby to produce festooning of said web, arch members carried by said sticks adjacent the ends of the sticks to support edge portions of the web, means carried by the arch members to engage and hold said edge portions of the web, and means urging said arch members apart whereby to transversely stretch the supported portions of the web.

11. In a web drying machine, a pair of parallel tracks, a series of sticks extending between said tracks and movable therealong, means to feed a web over the tops of said sticks, means to advance the sticks along the tracks and arranged and constructed to produce the differential movement of adjacent sticks whereby to produce festooning of said web, members carried by said sticks adjacent the ends of the sticks to support edge portions of the web, means carried by the members to engage and hold said edge portions of the web, means urging said members apart whereby to transversely stretch the supported portions of the web, and means to move one of said members toward the other upon each stick being in position to receive the web.

12. In a web festooning mechanism, a web carrier, feed rolls at the end of said carrier and against the peripheries of which the web may be forced, said rolls being located at opposite edges of the web, each of said rolls having a web contacting portion slidable circumferentially of the roll, spring means urging said contacting portion in the direction of revolution of the rolls, and a series of spaced sticks movable in succession beneath said rolls and over which the web is draped.

13. In a web drying machine, a pair of parallel tracks, a series of sticks extending between said tracks and movable therealong, means to feed a web over the tops of said sticks, means to advance the sticks along the tracks and arranged and constructed to produce the differential movement of adjacent sticks whereby to produce festooning of said web, means to produce transverse stretching of the portions of the web extending over the respective sticks, and means to force the web into engagement with the last mentioned means.

14. In a web drying machine, a pair of parallel tracks, a series of sticks extending between said tracks and movable therealong, means to feed a web over the tops of said sticks, means to advance the sticks along the tracks and arranged and constructed to produce the differential movement of adjacent sticks whereby to produce festooning of said web, arch members carried by said sticks adjacent the ends of the sticks to support edge portions of the web, means carried by the arch members to engage and hold said edge portions of the web, means to force the web into engagement with the last mentioned means, and means urging said arch members apart whereby to transversely stretch the supported portions of the web.

15. In a web drying machine, a pair of parallel tracks, a series of sticks extending between said tracks and movable therealong, means to feed a web over the tops of said sticks, means to advance the sticks along the tracks and arranged and constructed to produce the differential movement of adjacent sticks whereby to produce festooning of said web, members carried by said sticks adjacent the ends of the sticks to support edge portions of the web, means carried by the members to engage and hold said edge portions of the web, means to force the web into engagement with the last mentioned means, means urging said members apart whereby to transversely stretch the supported portions of the web, and means to move one of said members toward the other upon each stick being in position to receive the web.

16. In a web drying machine, a pair of parallel tracks, a series of sticks extending between said tracks and movable therealong, means to feed a web over the tops of said sticks, means to advance the sticks along the tracks and arranged and constructed to produce the differential movement of adjacent sticks whereby to produce festooning of said web, means to produce transverse stretching of the portions of the web extending over the respective sticks, and a pair of rollers beneath which said web passes, said rollers being positioned for engagement by the last mentioned means successively.

17. In a web drying machine, a pair of parallel tracks, a series of sticks extending between said tracks and movable therealong, means to feed a web over the tops of said sticks, means to advance the sticks along the tracks and arranged and constructed to produce the differential movement of adjacent sticks whereby to produce festooning of said web, arch members carried by said sticks adjacent the ends of the sticks to support edge portions of the web, means carried by the arch members to engage and hold said edge portions of the web, a pair of penetrable wheels beneath which said arch members ride whereby the web is forced into engagement with the last mentioned means, and means urging said arch members apart whereby to transversely stretch the supported portions of the web.

18. In a web drying machine, a pair of parallel tracks, a series of sticks extending between said tracks and movable therealong, means to feed a web over the tops of said sticks, means to advance the sticks along the tracks and arranged and constructed to produce the differential movement of adjacent sticks whereby to produce festooning of said web, members carried by said sticks adjacent the ends of the sticks to support edge portions of the web, means carried by the members to engage and hold said edge portions of the web, a pair of penetrable wheels beneath which said arch members ride whereby the web is forced into engagement with the last mentioned means, means urging said members apart whereby to transversely stretch the supported portions of the web, and means to move one of said members toward the other upon each stick being in position to receive the web.

19. In a sensitizing coating machine, means for carrying film comprising members having laterally spaced curved film supports engageable only at the edge portions of a coated film, the radii of which are of such magnitude as to cause arching of the supported film proportional to its buckling resistance when carrying an emulsion coating and operative to prevent such buckling, means for moving the supports relatively longitudinally of the member for carrying film, to compensate for expansion and contraction of the film, and means for forcing the film into engagement with said supports.

20. In a sensitizing coating machine, means for carrying film comprising members having laterally spaced curved film supports engageable only at the edge portions of a coated film, the radii of which are of such magnitude as to cause arching of the supported film proportional to its buckling resistance when carrying an emulsion coating and operative to prevent such buckling, means for moving the supports relatively longitudinally of the member for carrying film, to compensate for expansion and contraction of the film, and presser wheels beneath which said curved film supports ride whereby the film is forced into engagement with said supports.

21. In a sensitizing coating machine, means for carrying film comprising members having laterally spaced curved film supports engageable only at the edge portions of a coated film, the radii of which are of such magnitude as to cause arching of the supported film proportional to its buckling resistance when carrying an emulsion coating and operative to prevent such buckling, film impaling members projecting from the film supports, and penetrable wheels beneath which said film supports and film ride whereby the film is impaled on said members.

22. In a sensitizing coating machine, means for carrying film comprising members having laterally spaced curved film supports engageable only at the edge portions of a coated film, the radii of which are of such magnitude as to cause arching of the supported film proportional to its buckling resistance when carrying an emulsion coating and operative to prevent such buckling, film impaling members projecting from the film supports, and means for forcing film on the impaling members and having penetrable portions.

23. In a sensitizing coating machine, means for carrying film comprising members having laterally spaced curved film supports engageable only at the edge portions of a coated film, the radii of which are of such magnitude as to cause arching of the supported film proportional to its buckling resistance when carrying an emulsion coating and operative to prevent such buckling, film impaling members projecting from the film supports, means for forcing film on the impaling members and having penetrable portions, means for conveying the members successively past the means for forcing film on the impaling members, and means for successively holding the members supporting the film periodically stationary.

24. In a sensitizing coating machine, means for carrying film comprising members having curved film supports, means for holding film on said supports, means whereby relative movement of the supports longitudinally of the member for carrying film is produced, and means for applying the film to the means for holding film on the supports and having penetrable portions.

25. In a web drying machine, a pair of parallel tracks, a series of sticks extending between said tracks and movable therealong, means to feed a web over the tops of said sticks, means to advance the sticks along the tracks and arranged and constructed to produce the differential movement of adjacent sticks whereby to produce festooning of said web, arch members carried by said sticks adjacent the ends of the sticks to support edge portions of the web, means carried by the arch members to engage and hold said edge portions of the web, a pair of wheels beneath which said arch members pass, penetrable pads mounted on said wheels for movement peripherally thereof and engaging said arch members as they pass beneath the wheels, and means urging said arch members apart whereby to transversely stretch the supported portions of the web.

26. In a web drying machine, a pair of parallel tracks, a series of sticks extending between said tracks and movable therealong, means to feed a web over the tops of said sticks, means to advance the sticks along the tracks and arranged and constructed to produce the differential movement of adjacent sticks whereby to produce festooning of said web, arch members carried by said sticks adjacent the ends of the sticks to support edge portions of the web, means carried by the arch members to engage and hold said edge portions of the web, a pair of penetrable wheels beneath which said arch members ride whereby the web is forced into engagement with the last mentioned means, means for rotatably supporting said wheels for swinging movement into and out of the path of said arch members, and means urging said arch members apart whereby to transversely stretch the supported portions of the web.

27. In a web drying machine, a pair of parallel tracks, a series of sticks extending between said tracks and movable therealong, means to feed a web over the tops of said sticks, means to advance the sticks along the tracks and arranged and constructed to produce the differential movement of adjacent sticks whereby to produce festooning of said web, members carried by said sticks adjacent the ends of the sticks to support edge portions of the web, means carried by the members to engage and hold said edge portions of the web, a pair of penetrable wheels beneath which said arch members ride whereby the web is forced into engagement with the last mentioned means, means for rotatably supporting said wheels for swinging movement into and out of the path of said arch members, means urging said members apart whereby to transversely stretch the supported portions of the web, and means to move one of said members toward the other upon each stick being in position to receive the web.

28. In a sensitizing coating machine, means for carrying film comprising members having curved laterally spaced film supports engageable only at the edge portion of a coated film, the radii of which are of such magnitude as to cause arching of the supported film proportional to its buckling resistance when carrying an emulsion coating and operative to prevent such buckling, film impaling members projecting from the film supports, penetrable wheels beneath which said film supports and film ride whereby the film is impaled on said members, and swinging supports for said wheels constructed and arranged to permit upward swinging movement of the wheels upon passage therebeneath of the film supports.

29. In a web drying machine, a pair of parallel tracks, a series of sticks extending between said tracks and movable therealong, means to feed a web over the tops of said sticks, means to advance the sticks along the tracks and arranged and constructed to produce the differential movement of adjacent sticks whereby to produce festooning of said web, arch members carried by said sticks adjacent the ends of the sticks to support edge portions of the web, means carried by the arch members to engage and hold said edge portions of the web, a pair of wheels beneath which said arch members pass, penetrable pads mounted on said wheels for movement peripherally thereof and engaging said arch members as they pass beneath the wheels, swinging arms supporting said wheels for upward movement as the arch members pass therebeneath, and means urging said arch members apart whereby to transversely stretch the supported portions of the web.

GEORGE C. BEIDLER.